(12) United States Patent
Sankaran et al.

(10) Patent No.: US 10,187,101 B2
(45) Date of Patent: Jan. 22, 2019

(54) REGENERATIVE DIFFERENTIAL DETECTOR

(71) Applicant: Texas Instruments Incorporated, Dallas, TX (US)

(72) Inventors: Swaminathan Sankaran, Allen, TX (US); Bradley Allen Kramer, Plano, TX (US); Baher S. Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/384,305

(22) Filed: Dec. 19, 2016

(65) Prior Publication Data

US 2018/0175835 A1 Jun. 21, 2018

(51) Int. Cl.
*H04B 1/24* (2006.01)
*H04L 25/02* (2006.01)
*H04B 1/18* (2006.01)

(52) U.S. Cl.
CPC ............. *H04B 1/24* (2013.01); *H04B 1/18* (2013.01); *H04L 25/026* (2013.01); *H04L 25/0268* (2013.01)

(58) Field of Classification Search
CPC ..... H04B 1/16; H04B 1/18; H04B 1/22; H04B 1/24; H04L 25/026; H04L 25/0264–25/0268
See application file for complete search history.

(56) References Cited

U.S. PATENT DOCUMENTS 9,178,725 B2 * 11/2015 Chang ................. G11C 5/063
9,379,746 B2 * 6/2016 Kramer .............. H04B 1/0475

* cited by examiner

*Primary Examiner* — Patrick O'Neill
(74) *Attorney, Agent, or Firm* — Michael A. Davis, Jr.; Charles A. Brill; Frank D. Cimino

(57) ABSTRACT

A regenerative differential receiver includes, for example, a transformer arranged to receive a modulated differential signal. A first detector is arranged to source a first output current for indicating a first power level in response to falling voltage of a first line of the modulated differential signal. A second detector is arranged to sink a second output current for indicating a second power level in response to rising voltage of a first line of the modulated differential signal. A cross-coupled latch is arranged to latch a state in response to the first and second power levels. The cross-coupled latch provides, for example, weak non-linear regeneration for increasing receiver gain and maximum operating frequencies.

19 Claims, 4 Drawing Sheets

REGENERATIVE DIFFERENTIAL DETECTOR

BACKGROUND

Processors are increasingly used to control devices such as controllers for motor control. The controllers often rely upon data from devices having differing power domains. Robust isolators are used to transfer data (e.g., information) between different power domains (for example) within a system so the various devices in a system can efficiently cooperate. The isolators use galvanic isolation to block direct current flow, which helps protect the integrity of the differing power domains. Solutions for various applications of the transceivers typically require high energy efficiency while carrying data over a wide range of data rates. However, increasing data rate capabilities often entails circuits having increased power consumption.

SUMMARY

The problems noted above can be addressed in a system and method for signal rectification and detection. A disclosed regenerative differential receiver includes, for example, a transformer arranged to receive a modulated differential signal. A first detector is arranged to source a first output current for indicating a first power level in response to falling voltage of a first line of the modulated differential signal. A second detector is arranged to sink a second output current for indicating a second power level in response to rising voltage of a first line of the modulated differential signal. A cross-coupled latch is arranged to latch a state in response to the first and second power levels. The cross-coupled latch provides, for example, weak non-linear regeneration for increasing receiver gain and maximum operating frequencies and data rates.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion.

Figure 1:
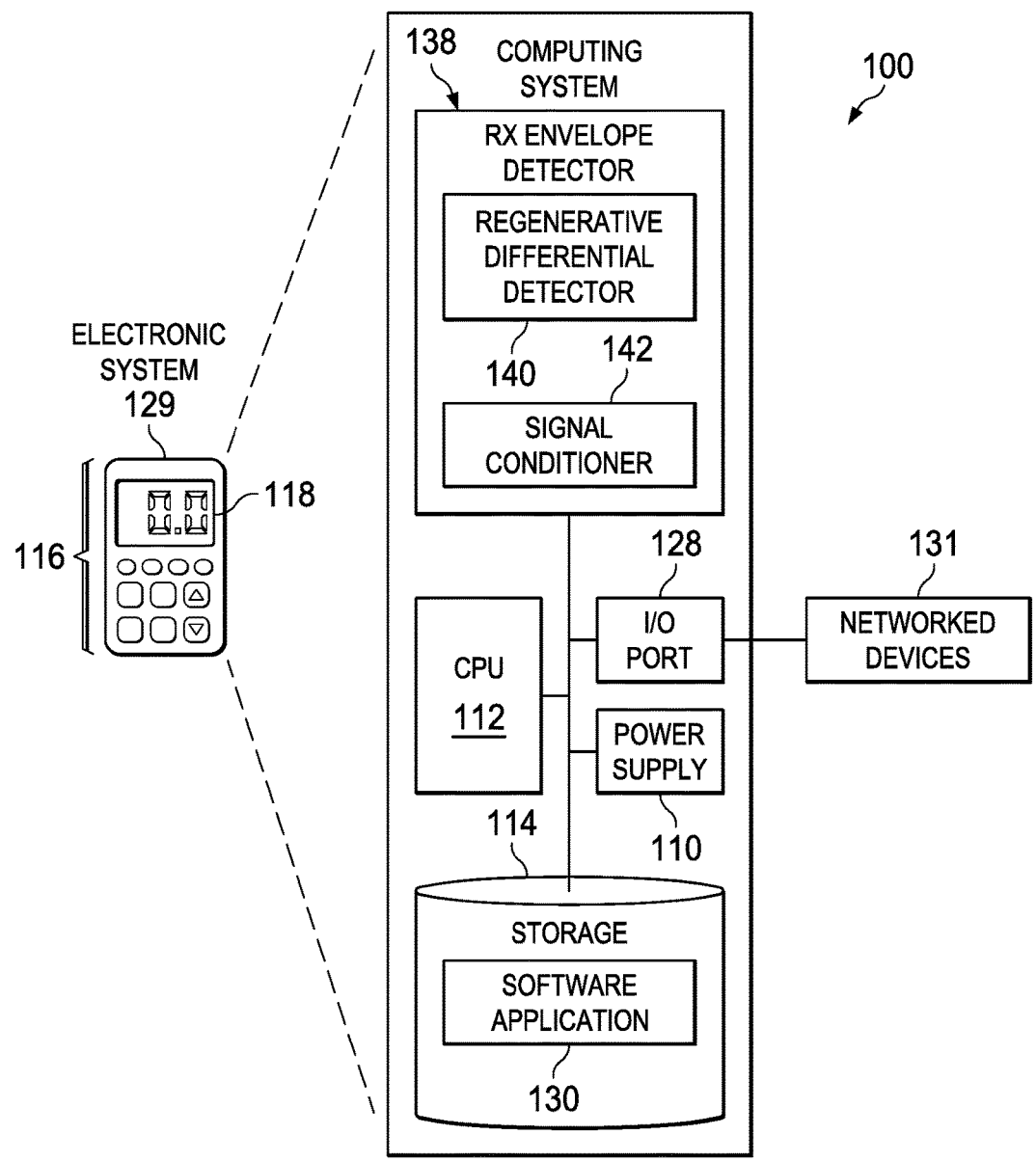
FIG. 1 shows an illustrative computing device 100 in accordance with preferred embodiments of the disclosure.

FIG. 1 shows an illustrative computing device 100 in accordance with preferred embodiments of the disclosure. For example, the computing device 100 is, or is incorporated into, an electronic system 129, such as a computer, electronics control "box" or module, robotics equipment (including fixed or mobile), automobiles, industrial motor controllers, or any other type of system where a computer uses differential signaling.

In some embodiments, the computing device 100 comprises a megacell or a system-on-chip (SoC) which includes control logic components such as a CPU 112 (Central Processing Unit), a storage 114 and a power supply 110. The CPU 112 includes functionality provided by discrete logic components and/or is arranged to execute application-specific instructions (e.g., software or firmware) that, when executed by the CPU 112, transform the CPU 112 into a special-purpose machine. The CPU 112 is arranged to receive decoded information detected by a receiver (RX) envelope detector 138, where the described envelope detector 138 is arranged to receive differential transmissions encoded with information transmitted from a transmitter coupled to another CPU 112.

The CPU 112 comprises memory and logic that store information frequently accessed (e.g., written to and/or read from) from the storage 114. The computing device 100 is often controlled by a user using a UI (user interface) 116, which provides output to and receives input from the user during the execution the software application 130. The output is provided using the display 118, which includes annunciators (such as indicator lights, speakers, vibrators, and the like) and controllers. The input is received using audio and/or video inputs (using, for example, voice or image recognition), and electrical and/or mechanical devices (such as keypads, switches, proximity detectors, gyros, accelerometers, resolvers, and the like).

The CPU 112 is coupled to I/O (Input-Output) port 128, which provides an interface that is configured to receive input from (and/or provide output to) networked devices 131. The networked devices 131 can include any device (including "Bluetooth" units that are electronically paired with the computing device 100) capable of point-to-point and/or networked communications with the computing device 100. The computing device 100 is optionally coupled to peripherals and/or computing devices, including tangible (e.g., non-transitory) media (such as flash memory) and/or cabled or wireless media. These and other input and output devices are selectively coupled to the computing device 100 by external devices using wireless or cabled connections.

The storage 114 is accessible, for example, by the networked devices 131. The CPU 112, storage 114, and power supply 110 can be coupled to an external power supply (not shown) or coupled to a local power source (such as a battery, solar cell, alternator, inductive field, fuel cell, capacitor, and the like).

The storage 114 (which can be memory such as on-processor cache, off-processor cache, RAM, flash memory, data registers, flip-flops, disk storage, and the like) stores one or more software applications 130 (e.g., embedded applications) that, when executed by the CPU 112, transform the computing device 100 into a special-purpose machine suitable for performing one or more targeted functions such as detection of information encoded in modulated signals (e.g., where the information and/or data is used to modulate a carrier frequency of a signal generated for transmission to the computing device 100).

The computing system 100 includes a receiver (RX) envelope detector 138 arranged to receive (radio-frequency, for example) differential transmissions. The receiver (RX) envelope detector 138 is arranged to reconstruct the envelope used to modulate a carrier frequency of the received transmission. The envelope indicates data (or other such information) used to modulate the carrier frequency. The receiver envelope detector 138 is "agnostic" with respect to being designed for receiving a signal for which a center carrier frequency is not predetermined. Further, the receiver envelope detector 138 does not require phase-lock looping (PLL) circuitry (which, when PPLs are used, additional operational limitations are imposed and power consumption is increased).

The receiver envelope detector 138 described herein includes a regenerative differential detector 140 (described below with respect to FIGS. 3 and 4) for efficiently providing "weak" non-linear regeneration (e.g., provided by an included weak cross-coupled latch) for increasing slew rates of reconstructed detected data, boosting amplitude (for increased gain) and speed (for increased data rates).

The regenerative differential detector 140 is coupled to send waveforms to a signal conditioner 142. For example, the signal conditioner 142 is arranged to enhance the integrity of the recovered signal. The signal conditioner 142 optionally includes a Schmitt trigger for converting the isolated signal from an analog value to a digital value. The signal conditioner 142 optionally includes a delay latch buffer for "deglitching" (e.g., filtering out erroneous transitions in) the digital-value signal where transitions in the signal exceed a bit rate expected for the digital information encoded in the transmitted signal. The signal conditioner is coupled to a sub-system or processor (such as CPU 112) for receiving information decoded from the transmitted signal.

Figure 2:
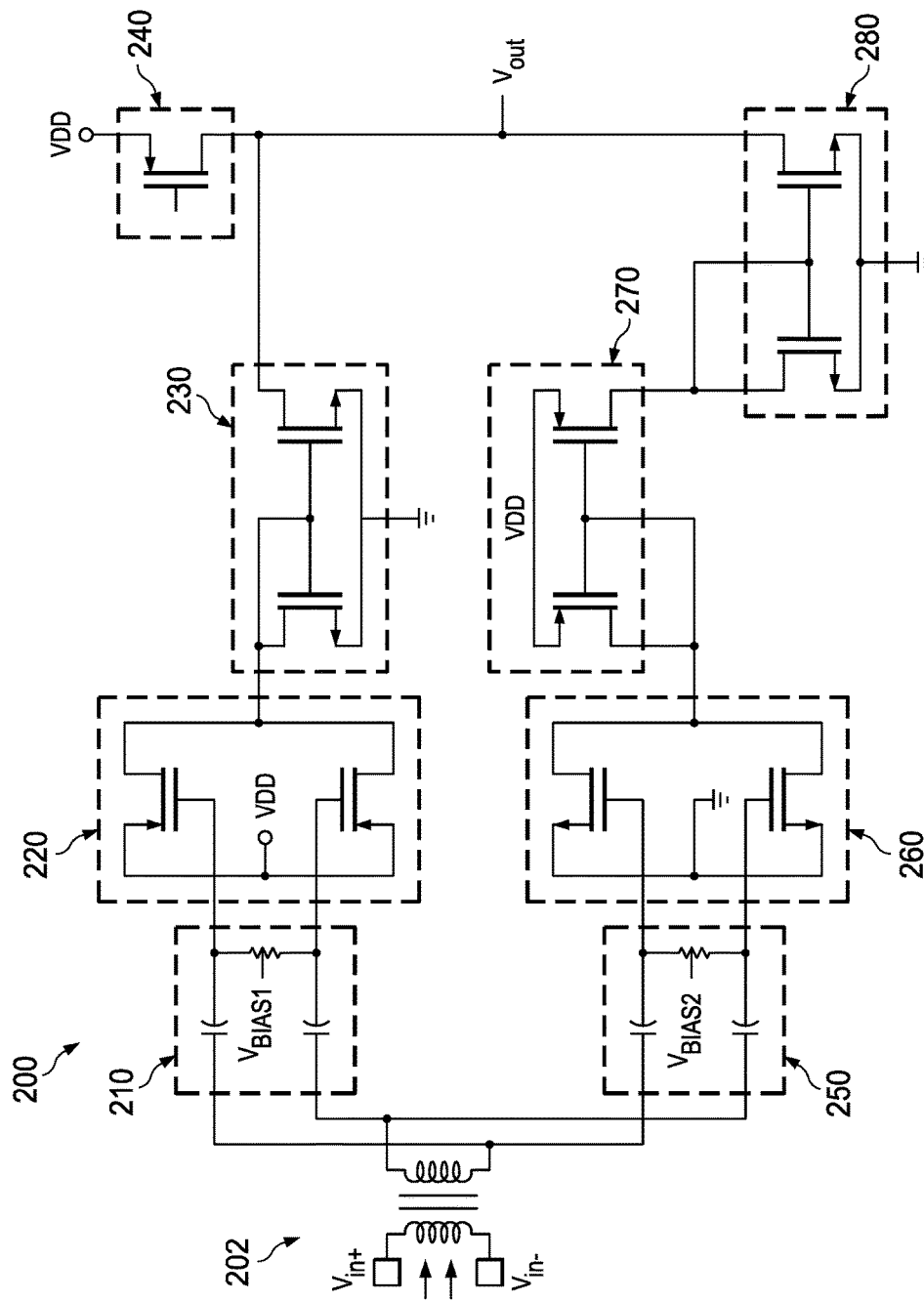
FIG. 2 is a schematic diagram of a receiver envelope detector 200.

FIG. 2 is a schematic diagram of a receiver envelope detector 200. The receiver envelope detector 200 includes a transformer 202, impedance balancing networks 210 and 250, square-law detectors 220 and 260, current mirrors 230, 270, 280, and load transistor 240. In general, the receiver envelope detector 200 is for envelope detection in an "on-off" keying system (e.g., where "bursts" of a carrier frequency are modulated so that information is conveyed by the presence or absence of a carrier frequency in a transmitted signal).

In operation, the transformer 202 is arranged to receive a modulated differential signal (where the modulation encodes information for transmission, reception, and decoding). The transformer 202 galvanically isolates a transmitting circuit (e.g., for transmitting the modulated differential signal), for example, from a receiving circuit (e.g., for receiving the modulated differential signal) by AC- (alternating current-) coupling the modulated differential signal from the primary coil to a secondary coil of the transformer 202. The transformer provides impedance matching to the transmitting circuit and optionally transforms (e.g., steps up) a voltage from the primary to secondary.

In accordance with operation of transformers, the positive terminal of the secondary of the transformer 202 is arranged to convey a signal having a transition in a direction (e.g., positive direction) that is opposite with respect to a concomitant transition in a direction (e.g., negative direction) of the negative terminal of the secondary of the transformer 202. The direction of the transitions (e.g., for AC-coupling) alternates in accordance with a carrier frequency of the conveyed signal. Accordingly, the transformer 202 is arranged to convey a differential signal using dual transmission lines (e.g., a differential pair) where a first line (e.g., "first end," "positive signal," "first node," "non-inverting output," and the like) conveys a signal encoded using a first polarity or direction and a second line (e.g., "opposing end," "negative signal," "opposite node," "inverting output," and the like) conveys the (e.g., "same") signal encoded using a second polarity or direction that is opposite to the first polarity or direction.

The positive and negative terminals of the secondary of the transformer 202 are respectively coupled to opposing inputs of the coupling network 210. The positive and negative terminals of the secondary of the transformer 202 are also respectively coupled to opposing inputs of the coupling network 250. The coupling network 210 and 250 are arranged to couple (e.g., AC-couple) the modulated differential signal received from the secondary of the transformer 202 to respective inputs of the square-law detectors 220 and 260 (as well as to provide impedance matching and balancing for the received modulated signal from the secondary of the transformer 202).

The outputs of the coupling network 210 are coupled to respective inputs of the square law detector 220. The square-law detector 220 is arranged in a "push-push" configuration so that, for example, the first PMOS transistor of the square-law detector 220 is turned on as the negative terminal of the secondary of the transformer 202 transitions low, and the second PMOS transistor of the square-law detector 220 is turned on as the positive terminal of the secondary of the transformer 202 transitions low.

Accordingly, the PMOS transistors of the square-law detector 220 are turned on (in response to the received differential signal AC-coupled to the respective gates of the PMOS transistors) in an alternating manner as the respective line (e.g., "side") of the received differential signal falls below the respective PMOS gate voltage. Both the first and second PMOS transistors of the square-law detector 220 are operated in an active or subthreshold region (e.g., active region) such that an amount of current carried (in accordance with principles of transconductance) by either the transistors when turned on is proportional to the square of the gate voltage of the PMOS respective transistor (e.g., in accordance with the principle of non-linear transconductance operation of CMOS transistors).

The outputs of the coupling network 250 are coupled to respective inputs of the square-law detector 260. The square-law detector 260 is also arranged in a "push-push" configuration so that, for example, the second NMOS transistor of the square-law detector 260 is turned on as the positive terminal of the secondary of the transformer 202 transitions high, while the first NMOS transistor of the square-law detector 260 is turned on as the negative terminal of the secondary of the transformer 202 transitions high.

Accordingly, a respective NMOS transistor in the square-law detector 260 is turned on when the received differential signal is at either a trough or a peak of (e.g., one side of) the differential signal. Both the first and second NMOS transistors of the square-law detector 260 are operated in an active or subthreshold region such that an amount of current carried by either the transistors when turned on is proportional to the square of the gate voltage of the NMOS respective transistor.

A first current mirror 230 is arranged to receive a current sourced by the square-law detector 220 and in response generates a mirrored current proportional to the received current, where the mirrored current is sourced from a drain of the (PMOS) load transistor 240. The second and third current mirrors 270 and 280 are arranged to receive a current sourced by the square-law detector 260 in response generate a mirrored current proportional to the received current, where mirrored current is sourced from the drain of full of transistor 240. Accordingly, the square-law detectors 220 and 260 are for generating a current that is twice (e.g., double) the square of the respective gate voltages of the PMOS and NMOS transistors. Further, the voltage developed at the drain of the low transistor 240 is the envelope of the envelope used to modulate the received modulated differential signal.

As disclosed herein, the current mirrors (e.g., 230, 270, and 280) by virtue of providing linear gain are "power hungry" (e.g., sourced with a current that is less than the current the output transistors of each current mirror would otherwise carry), which in turn limits the maximum frequency response of the receiver envelope detector 200 for a given power budget. Further, AC-coupling reduces the slew rate of the upward-rising and downward-falling edges of the received modulated differential signal, where the reduced slew rate limits the frequency response of the output current of the current mirrors (230, 270, and 280) and the voltage developed at the drain of the load transistor 240.

Figure 3:
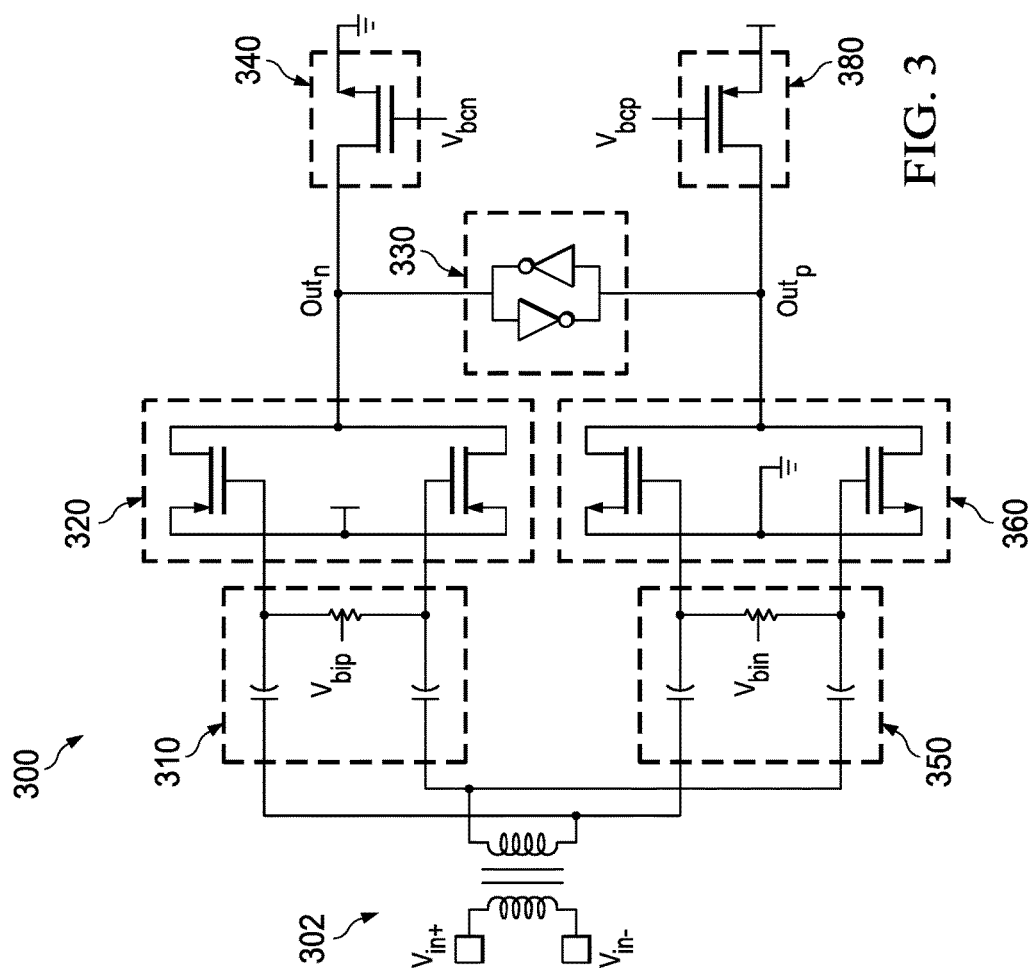
FIG. 3 is a schematic diagram of a regenerative differential detector 300 in accordance with embodiments of the present disclosure.

FIG. 3 is a schematic diagram of a regenerative differential detector 300 in accordance with embodiments of the present disclosure. The regenerative differential detector 300 includes a transformer 302, impedance balancing networks 310 and 350, square-law detectors 320 and 360, regenerative latch 330 (e.g., which provides non-linearly gained push-pull operation), and load transistors 340 and 380. As disclosed herein, the regenerative latch 330 increases the slew rate of the fully differential output (e.g., where both the double-ended output and the increased slew rate increase the operating frequency range of the regenerative latch 330). The regenerative differential detector 300 is arranged for envelope detection in (for example) an "on-off" keying system.

In operation, the transformer 302 is arranged to receive a modulated differential signal. The transformer 302 galvanically isolates a transmitting circuit, for example, from a receiving circuit by AC-coupling the modulated differential signal from the primary coil to a secondary coil of the transformer 302. The transformer 302 is arranged to match the impedance to a transmitting circuit and can optionally step up the voltage from primary to secondary.

In accordance with operation of transformers, the positive terminal of the secondary of the transformer 302 is arranged to convey a signal (including a power signal) having a transition in a direction (e.g., positive direction) that is opposite with respect to a concomitant transition in a direction (e.g., negative direction) of the negative terminal of the secondary of the transformer 302. The direction of each successive transition alternates in accordance with a carrier frequency of the conveyed signal. Accordingly, the transformer 302 is arranged to convey a differential signal using dual transmission lines (e.g., a differential pair) where a first line (e.g., of a double-ended pair) conveys a signal encoded using a first polarity or direction and a second line (e.g., of the double-ended pair) conveys the (e.g., "original") signal encoded using a second polarity or direction that is opposite to the first polarity or direction.

The positive and negative terminals of the secondary of the transformer 302 are respectively coupled to opposing inputs of coupling network 310. The positive and negative terminals of the secondary of the transformer 302 are respectively coupled to opposing inputs of the coupling network 350. The coupling network 310 and 350 are arranged to (e.g., AC-) couple the modulated differential signal received from the secondary of the transformer 302 to respective inputs of the square-law detectors 320 and 360 (as well as to provide balancing for the received modulated signal from the secondary of the transformer 302). The square-law detector 320 includes PMOS transistors, which are of a type (P-type) that is opposite to the type (N-type) of transistors of the square-law detector 360.

The outputs of the coupling network 310 are coupled to respective inputs of the square law detector 320. The square-law detector 320 is arranged in a "push-push" configuration so that, for example, the first PMOS transistor of the square-law detector 320 is turned on as the negative terminal of the secondary of the transformer 302 transitions low, and the second PMOS transistor of the square-law detector 320 is turned on as the positive terminal of the secondary of the transformer 302 transitions low.

Accordingly, the PMOS transistors of the square-law detector 320 are turned on in an alternating manner as the respective line (e.g., "side") of the received differential signal falls below the respective PMOS gate voltage. Both the first and second PMOS transistors of the square-law detector 320 are operated in an active or subthreshold region such that an amount of current carried by either (or both) the transistors when turned on is proportional to the square of the gate voltage of the PMOS respective transistor. Accordingly, the output current generated by the square-law detector 320 is an output current for indicating a first power level in response to falling voltage of a first line of a modulated differential signal and a falling voltage of a second line of the modulated differential signal.

The outputs of the coupling network 350 are coupled to respective inputs of the square-law detector 360. The square-law detector 360 is also arranged in a push-push configuration so that, for example, the second NMOS transistor of the square-law detector 360 is turned on as the positive terminal of the secondary of the transformer 302 transitions high, while the first NMOS transistor of the square-law detector 360 is turned on as the negative terminal of the secondary of the transformer 302 transitions high.

Accordingly, a respective NMOS transistor in the square-law detector 360 is turned on when the received differential signal is at either a trough or a peak of (e.g., one side of) the differential signal. Both the first and second NMOS transistors of the square-law detector 360 are operated in an active or subthreshold region such that an amount of current carried by either the transistors when turned on is proportional to the square of the gate voltage of the NMOS respective transistor. Accordingly, the output current generated by the square-law detector 360 is for indicating a second power level in response to rising voltage of a first line of the modulated differential signal and a rising voltage of a second line of the modulated differential signal, wherein the current output by the square-law detector 360 has a direction opposite to the current output by the square-law detector 320.

The first and second output currents are arranged in a "push-pull" configuration, which doubles (e.g., amplification of) the total output current. The push-pull configuration provides a fully differential output (e.g., which increases maximum operating frequencies and common mode rejection) to be provided for high-speed processing circuits (e.g., for converting the detected envelopes into data) that include differential inputs.

The cross-coupled latch 330 is coupled between the outputs of the first and second square-law cells and is arrange to latching a state indicated by the first and second power levels. The cross-coupled latch 330 includes first and second inverters, where the output of the first inverter is coupled to the input of the second inverter, and the output of the second inverter is coupled to the input of the first inverter. The output transistors of the first and second inverters are relatively weak (with respect to the current output by the drains of the transistors of the first and second square-law detectors) such that, for example, the cross-coupled latch 330 is toggled in response to changes in voltages developed at either or both the respective drains of the first and second square-law detectors 320 and 360.

The NMOS load transistor 340 is arranged to receive the first output current for indicating the first power level. The first output voltage developed at the drains (node Outn) of the first square-law detector 320 is developed in response to the current (e.g., for indicating the first power level) sourced by the first square-law detector 320, a relatively weak current sourced by an inverter of the cross-coupled latch 330, and the current sunk by the NMOS load transistor 340.

The PMOS load transistor 380 is arranged to receive the second output current for indicating the second power level. The second output voltage developed at the drains (node Outp) of the second square-law detector 360 is developed in response to the current (e.g., for indicating the second power level) sunk by the second square-law detector 360, a relatively weak current sourced by an inverter of the cross-coupled latch 330, and the current sourced by the load transistor 380. Accordingly, a square-law cell is coupled to a load transistor of a type complementary to the transistors of the coupled-to square-law cell.

The cross-coupled latch 330 and the first and second square-law cells 320 and 360 of the regenerative differential detector 300 performs envelope detection for indicating information encoded in the received modulated differential signal. Accordingly, the first output voltage and the second output voltage are asserted as a differential output for indicating the detected envelope.

Figure 4:
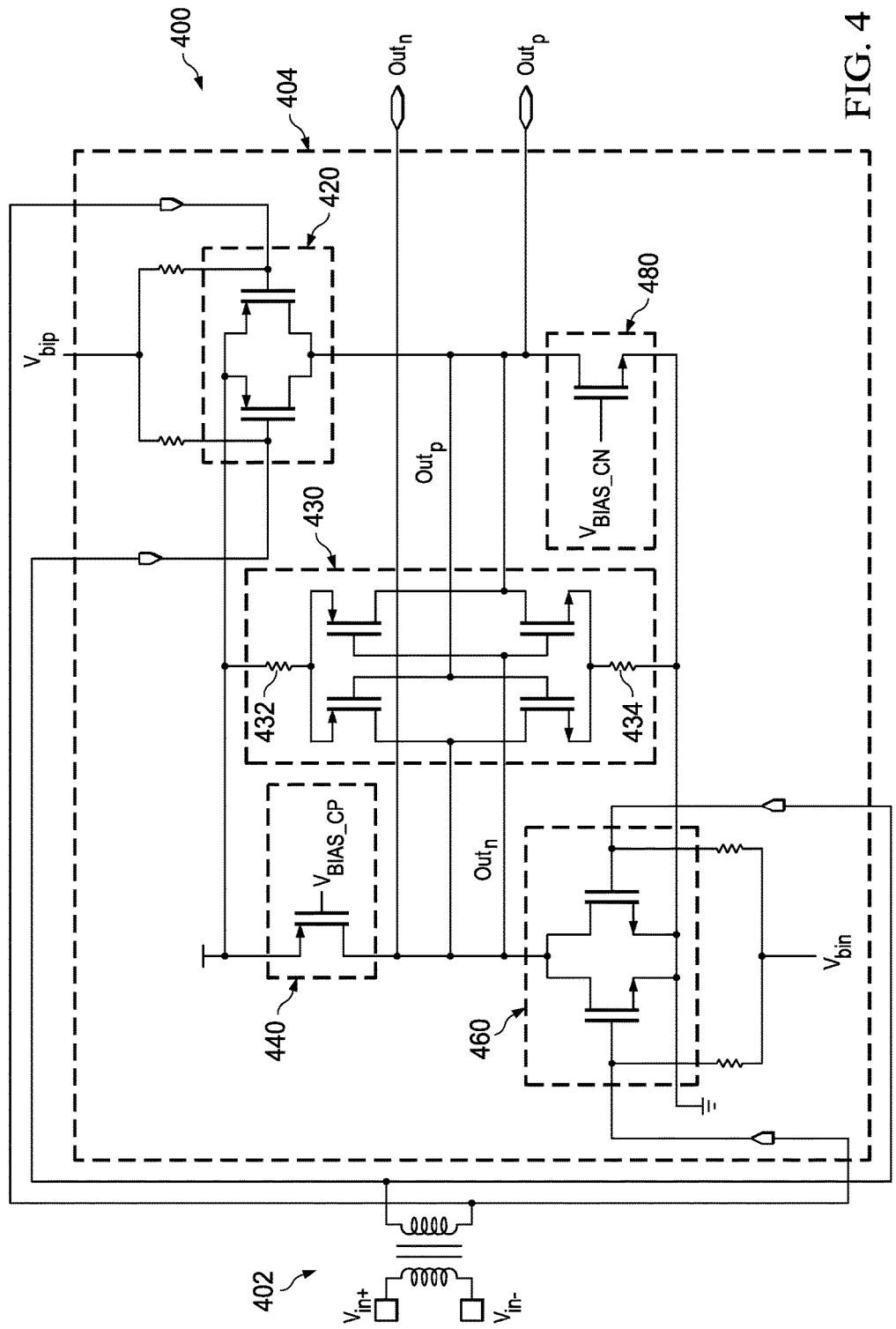
FIG. 4 is a layout diagram of a regenerative differential detector 400 in accordance with embodiments of the present disclosure.

FIG. 4 is a schematic diagram of a regenerative differential detector 400 in accordance with embodiments of the present disclosure. The regenerative differential detector 400 includes a transformer 402 and a substrate 404 upon which are formed coupling networks, detectors 420 and 460, regenerative latch 430, and load transistors 440 and 480.

In an embodiment, the arrangement of the schematic symbols and interconnections (e.g., nets) of FIG. 4 show the arrangement of the silicon structures (e.g., associated with each schematic symbol) in the substrate 404. For example, a portion of the cross-coupled latch 430 (e.g., of the silicon structures used to implement to the functions of the cross-coupled latch) is arranged between a portion of the square-law detector 420 (e.g., of the silicon structures thereof) and a portion of the second square-law detector 460 (e.g., of the silicon structures thereof). The arrangement of the silicon structures of the coupling networks, detectors 420 and 460, regenerative latch 430, and load transistors 440 and 480 increases the performance of the regenerative differential detector 400 as described below.

The regenerative latch 430 increases the slew rate of the fully differential output and is laid out to reduce net capacitances, while providing symmetry for enhancing similar performance of the complementary detectors and associated paths. In an embodiment, a portion of the cross-coupled latch 430 is arranged (e.g., disposed, laid out, formed, and the like) between a portion of the detector 420 and a portion of the detector 460. The central location minimizes net capacitances and shortens propagation delays, and provides symmetry between the first and second detectors and the associated signal paths.

The regenerative latch 430 include resistors 432 and 434. The value of the resistors 432 and 434 is selected so that the outputs of the regenerative latch 430 are weak with respect to the respective outputs of the detectors 420 and 460. For example, each of the resistors 432 and 434 limited the drive strength of the output transistors of the regenerative latch 430 so that the state of the regenerative latch 430 can be toggled (e.g., forced to a different state) in response to one or both of the respective outputs of the detectors 420 and 460. In various embodiments, the regenerative latch can take different forms, such as an arrangement of cross-coupled gates (e.g., NAND or NOR) gates (where a NAND gate in an inverting logical "AND" gate and a NOR gate is an inverting inclusive "OR" gate).

As shown in FIG. 4, the components of the regenerative differential detector 400 are symmetrically arranged on substrate 404, which reduces parasitic impedances and layout asymmetries in signal propagation lengths. The reduced parasitic impedances and layout asymmetries increases power efficiencies and provides higher operating frequencies.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A circuit, comprising:
  first and second lines to receive a modulated differential signal;
  a first square-law detector, coupled to the first and second lines, to source a first output current in response to a voltage of the first line and a voltage of the second line, the first output current having a first direction, the voltage of the first line having a first polarity, and the voltage of the second line having a second polarity opposite the first polarity;
  a second square-law detector, coupled to the first and second lines, to sink a second output current in response to the voltage of the first line and the voltage of the second line, the second output current having a second direction opposite the first direction; and
  a cross-coupled latch to latch a state in response to the first and second output currents.

2. The circuit of claim 1, wherein:
the first square-law detector includes: a first PMOS transistor having a gate coupled to the voltage of the first line; and a second PMOS transistor having a gate coupled to the voltage of the second line; wherein a drain of the first PMOS transistor is coupled to a drain of the second PMOS transistor; and
the second square-law detector includes: a first NMOS transistor having a gate coupled to the voltage of the first line; and a second NMOS transistor having a gate coupled to the voltage of the second line; wherein a drain of the first NMOS transistor is coupled to a drain of the second NMOS transistor.

3. The circuit of claim 2, further comprising: an NMOS load transistor coupled to sink the first output current from the drains of the first and second PMOS transistors; and a PMOS load transistor coupled to source the second output current from the drains of the first and second NMOS transistors.

4. The circuit of claim 3, wherein: the cross-coupled latch includes first and second inverters; an output of the first inverter is coupled to an input of the second inverter; and an output of the second inverter is coupled to an input of the first inverter.

5. The circuit of claim 4, wherein: the input of the first inverter is coupled to the drains of the first and second PMOS transistors; and the input of the second inverter is coupled to the drains of the first and second NMOS transistors.

6. The circuit of claim 5, further comprising a differential voltage output having first and second outputs to indicate an envelope of information encoded in the modulated differential signal, the first output being coupled to the drains of the first and second PMOS transistors, and the second output being coupled to the drains of the first and second NMOS transistors.

7. The circuit of claim 2, wherein the first and second PMOS transistors and the first and second NMOS transistors are biased in accordance with an active or subthreshold mode of transconductance.

8. The circuit of claim 1, further comprising a device to galvanically isolate a transmitter from the first and second square-law detectors, wherein the first and second lines are coupled through the device to receive the modulated differential signal from the transmitter.

9. The circuit of claim 8, wherein: the device is a transformer; a secondary coil of the transformer is coupled to the first and second lines; and a primary coil of the transformer is coupled to the transmitter.

10. The circuit of claim 9, wherein the first square-law detector is coupled through a first coupling network to the first and second lines, and the second square-law detector is coupled through a second coupling network to the first and second lines.

11. The circuit of claim 1, wherein the state toggles in response to a change in the first output current and/or the second output current.

12. A method, comprising:
receiving a modulated differential signal from first and second lines;
generating a first output current in response to a voltage of the first line and a voltage of the second line, the first output current having a first direction, the voltage of the first line having a first polarity, and the voltage of the second line having a second polarity opposite the first polarity;
generating a second output current in response to the voltage of the first line and the voltage of the second line, the second output current having a second direction opposite the first direction; and
latching a state in response to the first and second output currents.

13. A circuit, comprising:
first and second lines to receive a modulated differential signal;
a first square-law detector, coupled to the first and second lines, to source a first output current in response to a voltage of the first line and a voltage of the second line, the first output current having a first direction, the voltage of the first line having a first polarity, the voltage of the second line having a second polarity opposite the first polarity, and the first square-law detector including: a first PMOS transistor having a gate coupled to the voltage of the first line; and a second PMOS transistor having a gate coupled to the voltage of the second line; wherein a drain of the first PMOS transistor is coupled to a drain of the second PMOS transistor;
a second square-law detector, coupled to the first and second lines, to sink a second output current in response to the voltage of the first line and the voltage of the second line, the second output current having a second direction opposite the first direction, and the second square-law detector including: a first NMOS transistor having a gate coupled to the voltage of the first line; and a second NMOS transistor having a gate coupled to the voltage of the second line; wherein a drain of the first NMOS transistor is coupled to a drain of the second NMOS transistor;
an NMOS load transistor coupled to sink the first output current from the drains of the first and second PMOS transistors;
a PMOS load transistor coupled to source the second output current to the drains of the first and second NMOS transistors; and
a cross-coupled latch including first and second inverters to latch a state in response to the first and second output currents, an output of the first inverter being coupled to an input of the second inverter, an output of the second inverter being coupled to an input of the first inverter, the input of the first inverter being coupled to the drains of the first and second PMOS transistors, and the input of the second inverter being coupled to the drains of the first and second NMOS transistors.

14. The circuit of claim 13, wherein the first and second PMOS transistors and the first and second NMOS transistors are biased in accordance with an active or subthreshold mode of transconductance.

15. The circuit of claim 13, wherein the state toggles in response to a change in the first output current and/or the second output current.

16. The circuit of claim 13, further comprising a differential voltage output having first and second outputs to indicate an envelope of information encoded in the modulated differential signal, the first output being coupled to the drains of the first and second PMOS transistors, and the second output being coupled to the drains of the first and second NMOS transistors.

17. The circuit of claim 13, further comprising a device to galvanically isolate a transmitter from the first and second square-law detectors, wherein the first and second lines are coupled through the device to receive the modulated differential signal from the transmitter.

18. The circuit of claim 17, wherein: the device is a transformer; a secondary coil of the transformer is coupled to the first and second lines; and a primary coil of the transformer is coupled to the transmitter.

19. The circuit of claim 18, wherein the first square-law detector is coupled through a first coupling network to the first and second lines, and the second square-law detector is coupled through a second coupling network to the first and second lines.

* * * * *